(12) United States Patent
Andersson et al.

(10) Patent No.: US 6,333,733 B1
(45) Date of Patent: Dec. 25, 2001

(54) POSITION-SENSING UNIT AND MULTIDIMENSIONAL POINTER COMPRISING ONE OR MORE SUCH UNITS

(75) Inventors: Björn Andersson, Helsingborg; Joakim Kvarnlöf, Lund; Bengt Andersson, Helsingborg, all of (SE)

(73) Assignee: Trioc AB, Helsingborg (SE)

( * ) Notice: Subject to any disclaimer, the term of this patent is extended or adjusted under 35 U.S.C. 154(b) by 0 days.

(21) Appl. No.: 09/260,502

(22) Filed: Mar. 2, 1999

Related U.S. Application Data (63) Continuation of application No. PCT/SE97/01450, filed on Sep. 1, 1997.

(30) Foreign Application Priority Data

Sep. 4, 1996 (SE) .................................................... 9603208

(51) Int. Cl.[7] ...................................................... G06F 13/00
(52) U.S. Cl. .......................... 345/157; 345/158; 345/161
(58) Field of Search ..................................... 345/157, 158, 345/161; 250/221, 222.1, 203.4, 203.3

(56) References Cited

U.S. PATENT DOCUMENTS 4,607,159   8/1986   Goodson et al. .
5,694,153 * 12/1997   Aoyagi et al. ........................ 345/161
5,926,264 * 7/1999   Beale et al. .......................... 345/158

FOREIGN PATENT DOCUMENTS

WO 95/26011   9/1995   (WO) .
WO 97/05567   2/1997   (WO) .

* cited by examiner

Primary Examiner—Richard Hjerpe
Assistant Examiner—Benjamin D. Bowers
(74) Attorney, Agent, or Firm—Finnegan, Henderson, Farabow, Garrett & Dunner, L.L.P.

(57) ABSTRACT

A position-sensing unit for determining a relative position in one or more dimensions of two units. One or more position-sensing units can be used in a multidimensional pointer, such as a control lever, for controlling a position in up to six dimensions of, e.g., and object on a display. A position-sensing unit comprises a radiation source, a detector and a screen element arranged in the beam path for partial screening off of radiation. The radiation source and the detector comprise individual or separate fields for emitting or detecting radiation, in which case it is possible to distinguish radiation associated with one field from radiation associated with other fields. The determination of a position is carried out based on a comparison between the intensities of non-screened-off radiation associated with the different fields. A radiation-spreading medium can be used in the fields to create "virtual" radiation surfaces and detector surfaces, respectively, in combination with separate radiation units and detector units, respectively.

14 Claims, 7 Drawing Sheets

POSITION-SENSING UNIT AND MULTIDIMENSIONAL POINTER COMPRISING ONE OR MORE SUCH UNITS

This application is a a Continuing Application of PCT International Application No. PCT/SE97/01450, filed Sep. 1, 1997, the contents of which are incorporated herein by reference.

FIELD OF THE INVENTION

The present invention relates on the one hand to a unit for determining a relative position of two mutually movable components, in one or more dimensions and, on the other hand, to an input unit in the form of a pointer for position control in several dimensions, especially six dimensions, said pointer using to this end position-sensing units according to the invention.

The invention is particularly applicable within the field of pointers and positioning means for multidimensional controlling of the position of a cursor, a pointer or other objects on a display. However, the invention is generally applicable to multidimensional position control, for instance for industrial robots and other equipment.

BACKGROUND ART

In computer engineering, different kinds of pointers and positioning means are used as input units, such as a joystick, a control ball, a mouse etc, which in manual operation generate electric control signals for multidimensional controlling, position control in CAD work or in computer and TV games often requires controllability within several degrees of freedom or dimensions. A user should be able to perform with his hand a number of different controlling movements in a logic or intuitive manner. In some modern applications, especially computer games, controllability is required in up to six dimensions, for example a linear movement in three directions and a rotating movement in three directions.

In the present application, the term "pointer" is to be interpreted in a wide sense and comprise all types of input units with one or more movable operating means for generating position control signals for multidimensional controlling of on object, by operating said operating means in different directions of operation.

SE-5,022,186 discloses an input unit in the form of a pointer for three-dimensional position control of e.g. a cursor on a display. An object, which especially can be the user's finger, is illuminated by two point sources of light. As a result, the object casts two shadows on a detector surface, which is made up of a plurality of separate detector elements for determining the absolute positions of the shadows. The position of the object in three dimensions is calculated on the basis of the absolute and relative positions of the two shadows.

This prior-art pointer has a relatively high total cost of components and may be difficult to manufacture with small dimensions, which prevents the pointer from being used as a partial component in more complex controlling devices. The reliability is limited. The size of the operating area is limited by the components.

For conversion of movements of a pointer into control signals, it is also known to use components of the PSD type (Position-Sensing Detector) or CCD type (Charge Coupled Device). However, these components are complicated and consequently expensive.

The International Patent Application under Publication No. WO 97/05567, which was filed before the priority date of the present application but was published after the priority date of the present application, discloses a pointer in the form of a control lever for controlling in several dimensions. In one embodiment, the operating handle supports a light source at its lower end. A stationary detector has four detector surfaces in the form of photodiodes, each forming a quadrant. Radiation from the movable source of light passes through an opening in a stationary screen and falls as a light spot on the detector surfaces. When the control lover is moved, the amount of light on the various detector surfaces varies. The current angular position of the operating handle in calculated on the basis of a comparison of light intensity on the various detector surfaces.

OBJECTS OF THE INVENTION

One object of the invention is to obviate the above-mentioned drawbacks of prior art.

A further object is to provide a position-sensing unit which can be accomplished with a small number of simple and inexpensive components and which can permit accurate determination of changes of a position.

A special object in to provide a position-sensing unit which is of simple design and can offer high reliability during a long life.

A special object of the invention is to provide an improved pointer for position control in two or more dimensions, especially six dimensions.

One object is to provide a pointer which allows position control in a logic and intuitive fashion, thereby reducing the risk of a user confusing different degrees of freedom.

SUMMARY OF THE INVENTION

With a view to achieving these and other objects, the invention concerns a position-sensing unit and a pointer having the features according to the independent claims. Preferred embodiments and variants of the invention are stated in the dependent claims.

Thus, the invention concerns a position-sensing unit, which in a first main variant comprises a radiation source having at least two fields, each having a radiating surface; a detector for detecting radiation from the respective fields, radiation from one field being distinguishable from radiation from other fields; a screen element which is arranged in the beam path between the radiation source and the detector and which, for each determination of a position and seen from the perspective of the detector, partially screens off at least the one field but not completely screens off any one of the fields, at least one of the radiation source and the detector being so movable relative to the screen element in a first direction transversely of the direction of radiation that such a relative movement causes a relative change of the screening off of the fields, and means for determining a relative position in said first direction between the screen and at least one of the radiation source and the detector, based on a comparison, such as the ratio, between radiation detected by the detector and received from the respective radiating fields.

In a second main variant, the detector is instead divided into two or more fields, which from the perspective of the radiation source are screened off to different degrees in the relative movement as above.

According to a specially preferred embodiment of the invention, independently of whether the fields are designed as radiating fields or radiation-detecting fields, a radiation-spreading medium, such as a plastic plate or the like, constitutes the surface of the field facing the screen element. The radiation-spreading medium can coact with a radiation unit or detector unit associated with the field for creating "virtual" radiating or radiation-detecting fields. This solution is considerably less expensive, up to a factor 100, compared with the use of active components having large radiation-generating or radiation-detecting surfaces.

In its simplest embodiment, a position-sensing unit according to the invention comprises only two fields, in which case a relative comparison between the radiation associated with the respective fields permits the determination of a position in one dimension. However, the unit is preferably arranged for position-sensing in two different directions in a plane extending transversely of the radiation. At least two fields should be arranged after each other in each of said two directions.

The source of radiation may consist of a "true" source of radiation, which generates the radiation. The source of radiation may also be an indirectly radiating component, which is caused to radiate by reflection of radiation from a source of radiation. Correspondingly, the detector may comprise a reflector which reflects transmitted radiation to a detector.

In a preferred embodiment, the screen element partially screens off all fields in each determination of a position, but it is also conceivable that one or some fields, depending on the total number of fields, can be non-screened off in the determination of a position and, optionally, always be non-screened off.

In a specially preferred embodiment, use is made of four fields, which adjoin each other along straight lines and constitute quadrants of a common surface. With such a design, the calculation of the relative position of the components included will be extremely simple, especially if the screen element is so designed and arranged that it allows, within the entire operating area of the unit, the passing of radiation associated with all four fields. Changes of the position in two directions in one plane can be easily calculated merely by a relative comparison between transmitted radiation associated with the various fields.

If the inventive position-sensing unit is such that a relative movement directed transversely of the beam path results in an angular change of the transmitted radiation, it is preferred that both the source of radiation and the detector can respectively emit and detect radiation within a range of angles.

It should be noted that primarily the orientation of the screen element in space is not important. The screen element should be arranged somewhere in the beam path in such a manner as to obtain a screening-off effect. Thus, the screen element can, for instance, also be oriented perpendicular or generally at some angle to the plane in which the parts move.

In one embodiment, the screen element comprises an element, which screens off inside a contour line and which at least partly is surrounded by an area that permits a free beam path between the source of radiation and the detector.

In a further embodiment of the invention, the screen element comprises an element, which screens off around a contour line and in which the screening-off element surrounds an opening formed therein. For instance, a detector on one side of the screen element "sees" various images of a radiating surface arranged on the other side, depending on the position of the detector, in the same manner as it is possible to watch different parts of a room through a keyhole.

Preferably, the screen element and the detector or the radiation source are assembled, such that the position-sensing unit comprises two components for mounting in an opposite, movable relationship. In this manner, an extremely flexibly applicable position-sensing unit is obtained.

BRIEF DESCRIPTION OF THE DRAWINGS

The invention will now be described in more detail with reference to the accompanying drawings, which for the purpose of exemplification show preferred embodiments of the invention.

DESCRIPTION OF EMBODIMENTS OF THE INVENTION

Figure 1:
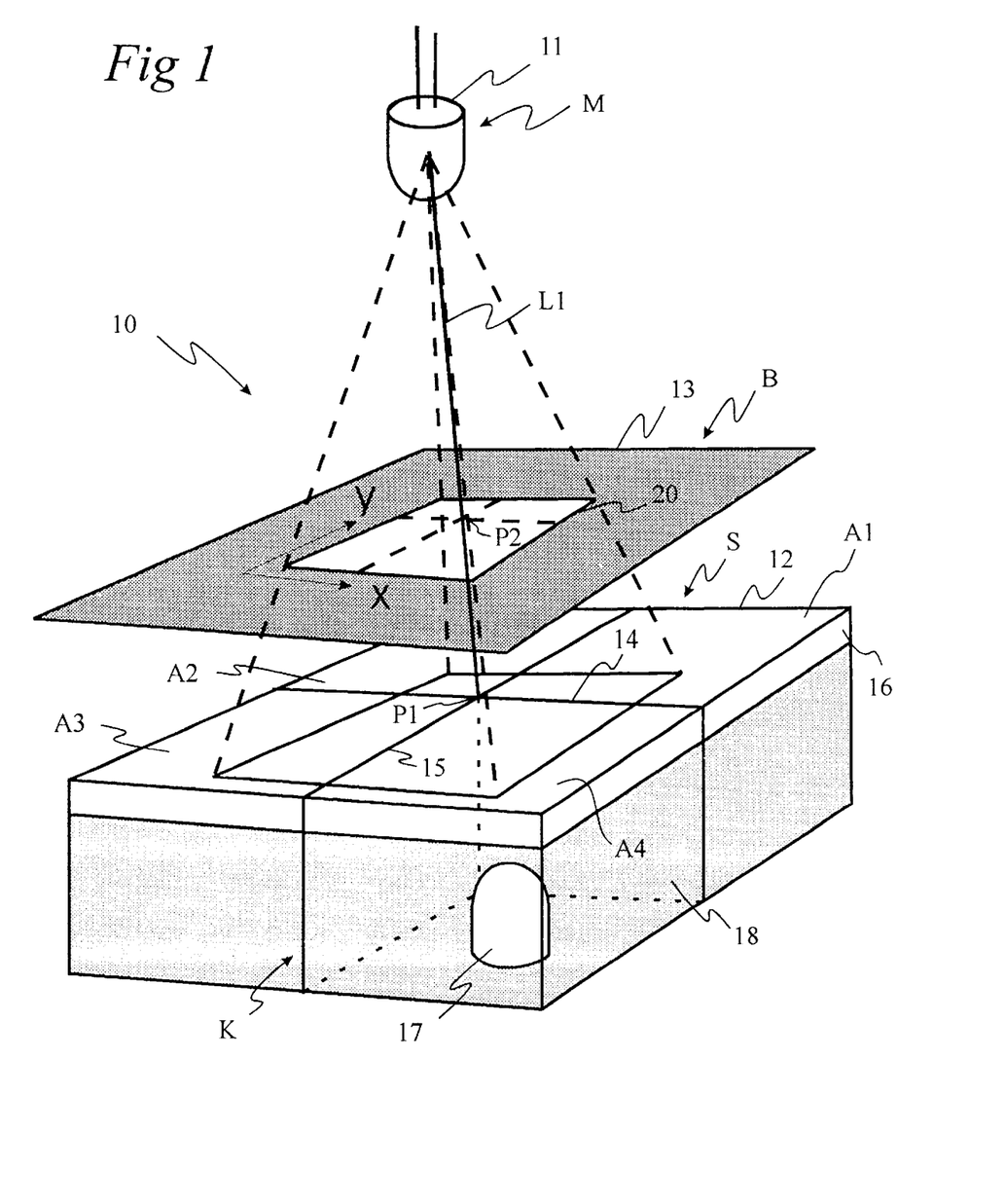
FIG. 1 is a schematic perspective view of a first embodiment of a two-dimensional position-sensing unit according to the invention.

FIG. 1 schematically shown three main components 11, 12, 13 in an embodiment of a two-dimensional position-sensing unit according to the invention, comprising on the one hand a field means 12 with a number of individual fields A1–A4 and, on the other hand, a means 11 coacting therewith, called coacting means. One of the field means 12 and the coacting means 11 is a source of radiation S for emitting radiation (directly or indirectly) while the other of the field means 12 and the coacting means 11 is a detector M for detecting the radiation and for emitting corresponding detector signals.

In the embodiments of the invention as illustrated and described, the field means 12 is a radiation source S for emitting radiation, and the coacting means 11 is a detector M for detecting radiation. Thus, radiation is emitted from the fields A1–A4, which therefore are referred to as radiation fields A1–A4. In other, not shown, embodiments the coacting means 11 may instead be radiating and the field means 12 receiving and detecting. This possibility of reversing the beam path applies to all embodiments, fields of application and modifications of the invention as described below.

An its third main component, the position-sensing unit in FIG. 1 comprises a screen element 13, which is positioned in the beam path between the radiation source S and the detector M and which is illustrated as a flat screen B for partial screening off of the radiation that is directed towards the detector M. Which parts of the radiation that are screened off by or pass the screen B depends on the relative position of the three main components S, M and B of the unit. If, for instance, one of the three is moved transversely of the beam path, the radiation will be screened off in soma other fashion. The positions of the three main components S, M, B relative to each other transversely of the beam path can be determined ambiguously by determining the amount of the radiation transmitted between the radiation source S and the detector M that is connected with the respective fields A1–A4, i.e. the amount of the transmitted radiation that is detected by or emitted from the respective fields A1–A4.

The radiation fields A1–A4 adjoin each other along two perpendicular intersecting lines 14, 15. As shown schematically in FIG. 1—however, for the sake of clarity for the field A4 only—each radiation field A1–A4 comprises a light-spreading element extended transversely of the beam path, such as a diffusion plastic plate 16, which is illuminated from behind by a radiation unit 17, in this case an IR light-emitting diode, associated with the field. In contrast to the IR light-emitting diode, which may be considered an "active" component, the light-spreading element 16 constitutes a "passive" component. The radiation source S thus comprises four IR diodes 17, each having a spreading plastic plate 16. Each IR diode 17 preferably illuminates its own plastic plate 16 only, and to this end, suitable screening walls 18 may be arranged between the IR diodes. Furthermore, the lateral edges of the plates 16 can be screened off from each other, thereby preventing the radiation from being spread between the plates.

Figure 8A:
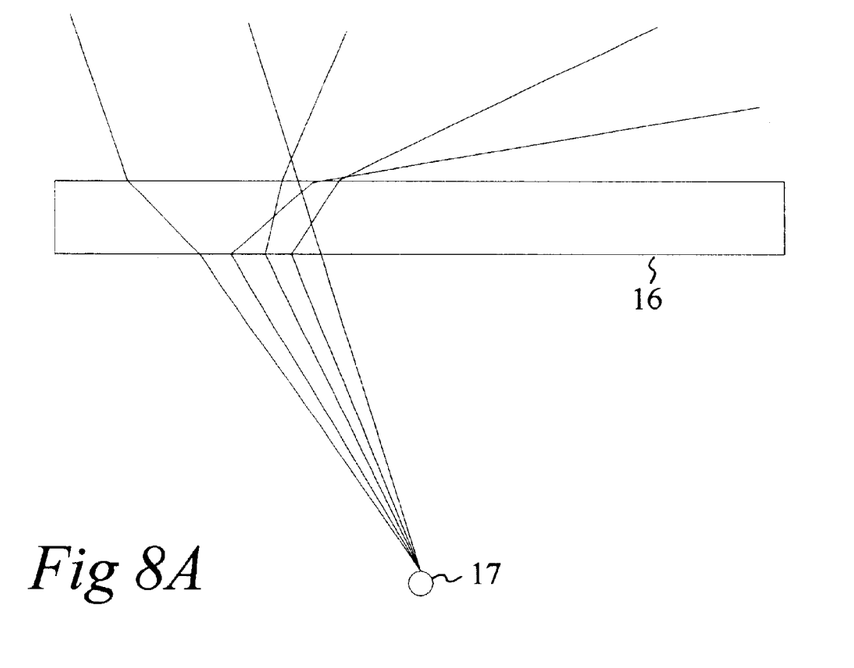
FIGS. 8A and 8B schematically show the function of light-spreading plates.
Figure 8B:
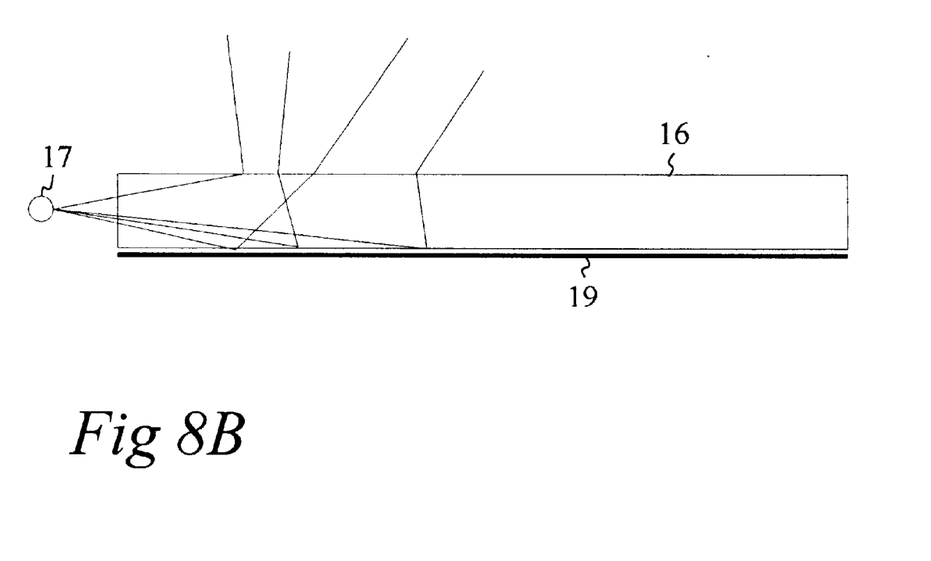

FIGS. 8A and 8B schematically show how a substantially punctiform radiation unit 17, corresponding to an IR light-emitting diode in FIG. 1, emits radiation to a spreading medium in the form of e.g. a plastic plate 16, either from below (FIG. 8A) or from the side (FIG. 8B). As a result, a "virtual" radiating surface is obtained in an extremely cheap and simple manner. In FIG. 8B a reflector 19 is arranged on one side of the plate.

If the fields A1–A4 are to be detecting instead of radiating, "virtually radiation-sensitive surfaces" can be created correspondingly by arranging a spreading medium in combination with separate detector units for each field. Compared with prior-art PSD and CCD components, the cost of components can be kept low and the construction can be made simple.

The IR diodes 17 of the radiation fields A1–A4 are activated with the aid of electric control means (not shown) in sequential time slots. This makes it possible to identify from which field A1–A4 the detected radiation is emitted. If the activation cycle besides contains at least on "passive" time slot in which all fields are inactivated, the effect of interfering environmental radiation, if any, can be eliminated by means of amplitude modulation. The environmental radiation can be detected in such a passive time slot, and this environmental radiation can be compensated for when detecting the radiation from the radiation fields. Other ways of making the radiation of the various fields A1–A4 distinguishable is to let the fields A1–A4 radiate at different wavelengths, at different polarisation direction/frequency.

The screen B has the form of a flat, sheet-like element 13 with radiation-blocking areas. A contour line 20 defines an opening, through which passes radiation from the four radiation fields A1–A4. The contour line 20 may have different forms.

In the embodiment according to FIG. 1, for instance the detector M can be movable in a plane which is essentially parallel with the fields A1–A4. Different areas of the radiation source S reach the detector M depending on the position of the detector M in a plane transversely of the radiation direction. This fact allows position-sensing in said plane, as will be described in more detail below with reference to FIG. 2. Corresponding results can also be obtained if the screen B or the radiation source S is movable transversely of the beam path.

FIGS. 2A–D show four different relative positions of the main components in FIG. 1, seen from the perspective of the detector M. For the sake of clarity, the outer part of the screen 13 is broken away, thereby permitting also parts of the outer edge of the radiation source S to be shown. In practice, the detector M, however, detects merely radiation passing through the opening of the screen 13. As an example, it may be assumed that the radiation source S and the screen 13 are fixed relative to each other, whereas the detector M is movable transversely of the radiation direction, i.e. movable in the plane of the paper in FIGS. 2A–D.

Figure 2A:
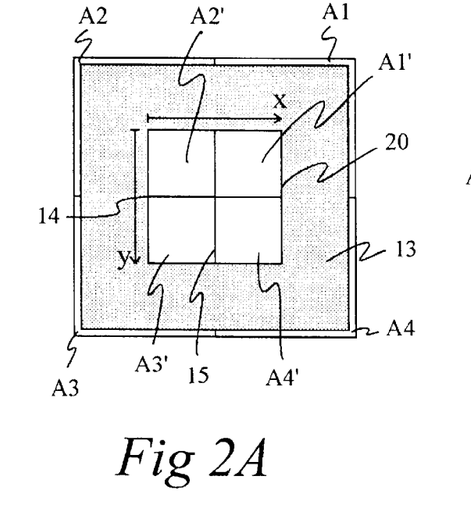
FIGS. 2A–D schematically illustrate the mode of operation of the position-sensing unit in FIG. 1.

In FIG. 2A, the detector M sees a "hairline cross", which is formed of the boundary lines 14, 15 and in which xy values in the marked coordinate system correspond to the intersection P2 of the lines 14, 15 in the plane of the screen B relative to the contour line 20, seen from the perspective of the detector M. In the example, the x and y values lie between 0 and 1, wherein 0 and 1 are extreme values where the lines 14, 15 coincide with the contour line 20. In FIG. 2A, the hairline cross is centrally positioned in the opening in position (0.5;0.5).

The position P2 of the "hairline cross" in the xy plane can be determined by a comparison between the unscreened surface portions A1'–A4' of the four radiation fields A1–A4. For calculating the y value, the detected intensity from the two upper unscreened surface portions A1' and A2' is summed up, the sum being divided by the detected total intensity from all the unscreened surface portions A1'–A4' (reference intensity). Correspondingly, the position of the hairline cross in x direction is calculated by summing up the intensities from the two right-hand unscreened surface portions A1' and A4'. The position of the hairline cross is calculated in the some way for the various positions in FIGS. 2A, 2C and 2D as follows, wherein $0 \leq y \leq 1$, $0 \leq x \leq 1$ and wherein A1'–A4' represent the radiation intensity from the corresponding fields A1–A4, which is detected by the receiver M.

FIG. 2A:

$$y=(A1'+A2')/(A1'+A2'+A3'+A4')=0.5$$

$$x=(A1'+A4')/(A1'+A2'+A3'+A4')=0.5$$

Figure 2B:
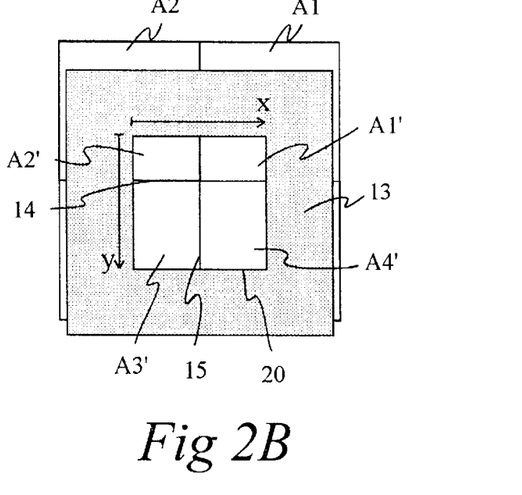

FIG. 2B.

$$y=(A1'+A2')/(A1'+A2'+A3'+A4')=0.32$$

$$x=(A1'+A4')/(A1'+A2'+A3'+A4')=0.5$$

Figure 2C:
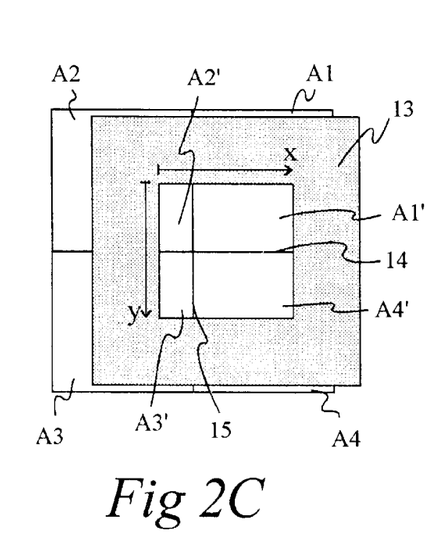

FIG. 2C:

$$y=(A1'+A2')/(A1'+A2'+A3'+A4')=0.5$$

$$x=(A1'+A4')/(A1'+A2'+A3'+A4')=0.25$$

Figure 2D:
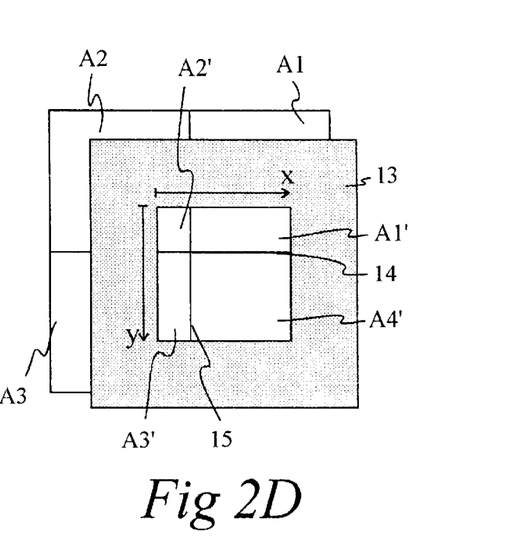

FIG. 2D:

$$y=(A1'+A2')/(A1'+A2'+A3'+A4')=0.32$$

$$x=(A1'+A4')/(A1'+A2'+A3'+A4')=0.25$$

The receiver thus "sees" larger or smaller parts A1'–A4' of the separate radiation fields A1–A4, which in this case consist of "backlighters" with IR diodes covered with diffusing plastic. The fields A1–A4 are activated successively, the IR levels being registered by means of the receiver M. The mutual proportionality of the four IR levels gives, after the above calculations, the position P2 of the hairline cross (see FIG. 1) in the plane of the screen B. Thus it does not matter at what distance from the surfaces the receiver is positioned since the calculations are based on the relationship of the received amounts of light. The absolute amount of received radiation may vary, but the relationship of the radiation intensities associated with the various fields is the same along a line.

The position of the centre P1 of the hairline cross in the radiation source S is known. The position of the centre P2 of the hairline cross in the plane of the screen B is calculated as above. This gives the position of two points P1 and P2 in space and, thus, the equation for the line L1 on which the receiver M is positioned.

Figure 3:
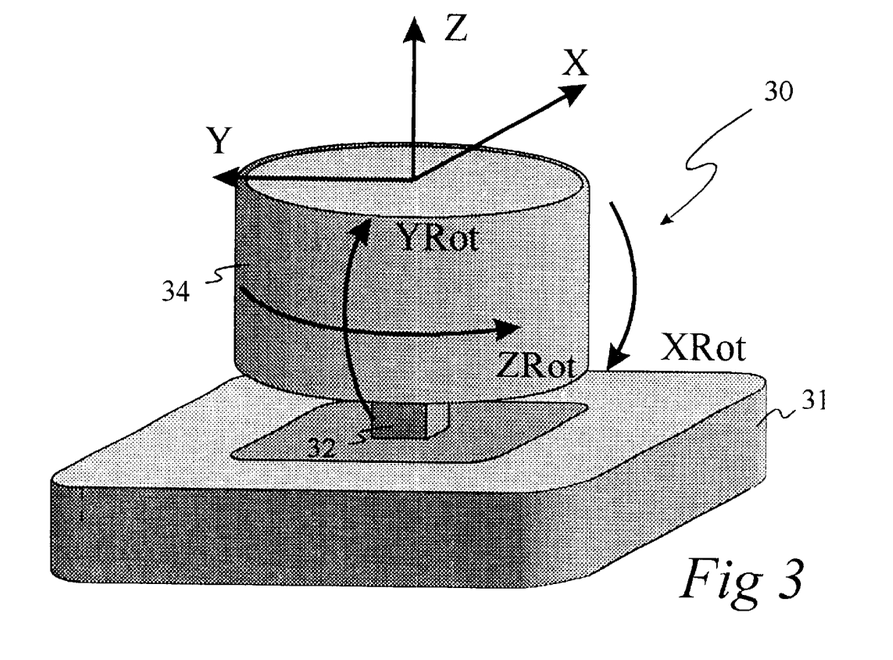
FIG. 3 is a schematic perspective view of a first embodiment of a six-dimensional pointer according to the invention.

FIG. 3 shows a first embodiment of a six-dimensional pointer 30 according to the invention. The pointer 30 has a stationary base 31 and a movable control lever 32. More specifically, the control lever 32 is vertically adjustable in z direction and freely displaceable in the lateral direction in the xy plane. A joint ball 33 located at the upper end of the control lever 32 supports a cylindrical operating means 34, which has a spherical recess which together with the joint ball 33 constitutes a ball-and-socket joint, for angular adjustment of the operating means relative to the control lever 32 in three perpendicular rotating directions Xrot, Yrot, Zrot. With a view to determining the relative angular position of the operating means 34 In these three directions relative to the control lever 32, the pointer 30 has inside the joint ball 33 two perpendicularly mounted position-sensing units 35, 36, of which one is two-dimensional and the other is one-dimensional. Each of them has a receiver M1, M2 mounted on the operating means 34, while the field and the screen are mounted on the control lever 32. The control lever 32 supports at its lower end a three-dimensional position-sensing unit 37 according to the invention, comprising two detectors M3, M4, which are mounted spaced apart on the lower end of the control lever 32 and directed downwards to a screen 13 and four radiation fields. The position-sensing unit 37 registers linear movements of the control lever 32 in the directions x, y, z. More specifically, this is carried out by the two detectors M3, M4 permitting determination of the position of two lines, instead of only one line as in FIG. 1. Knowing the directions of the lines and the relative distance of the detectors M3, M4, it is possible, by triangulation, to determine the position of the control lever 32 also in the z direction. By linear affection of the control lever 32 via the operating means 34, linear controlling x, y, z is thus carried out, and by rotating of the control means 34, controlling in three rotating directions Xrot, Yrot, Zrot is carried out.

Figure 5:
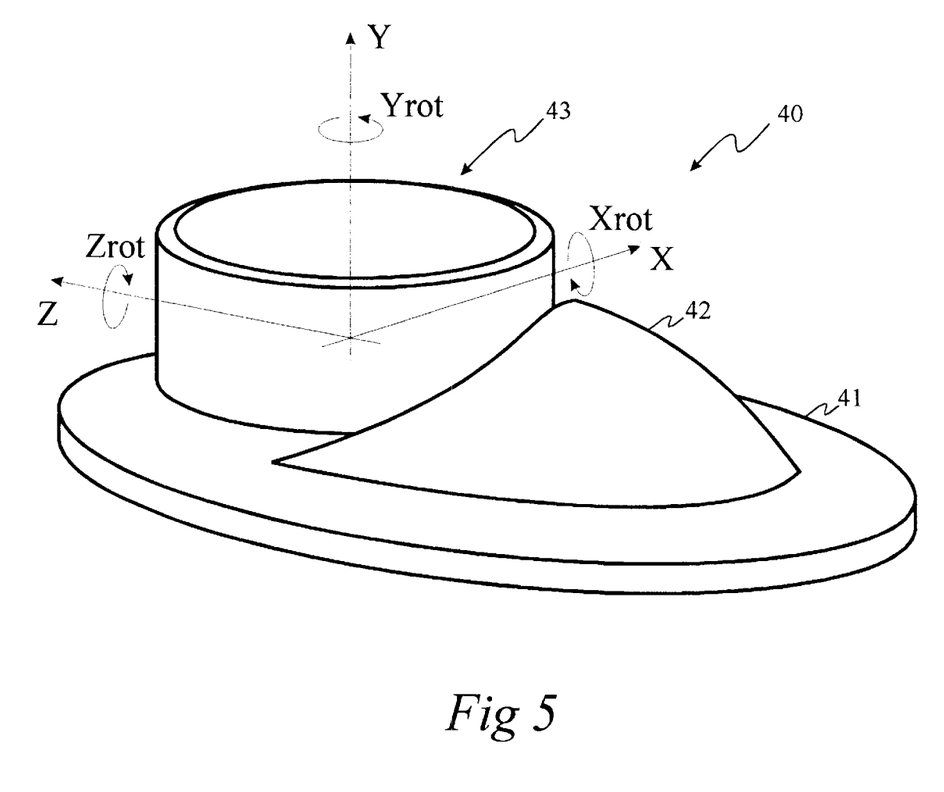
FIG. 5 schematically shows a currently preferred embodiment of a six-dimensional pointer according to the invention.
Figure 6:
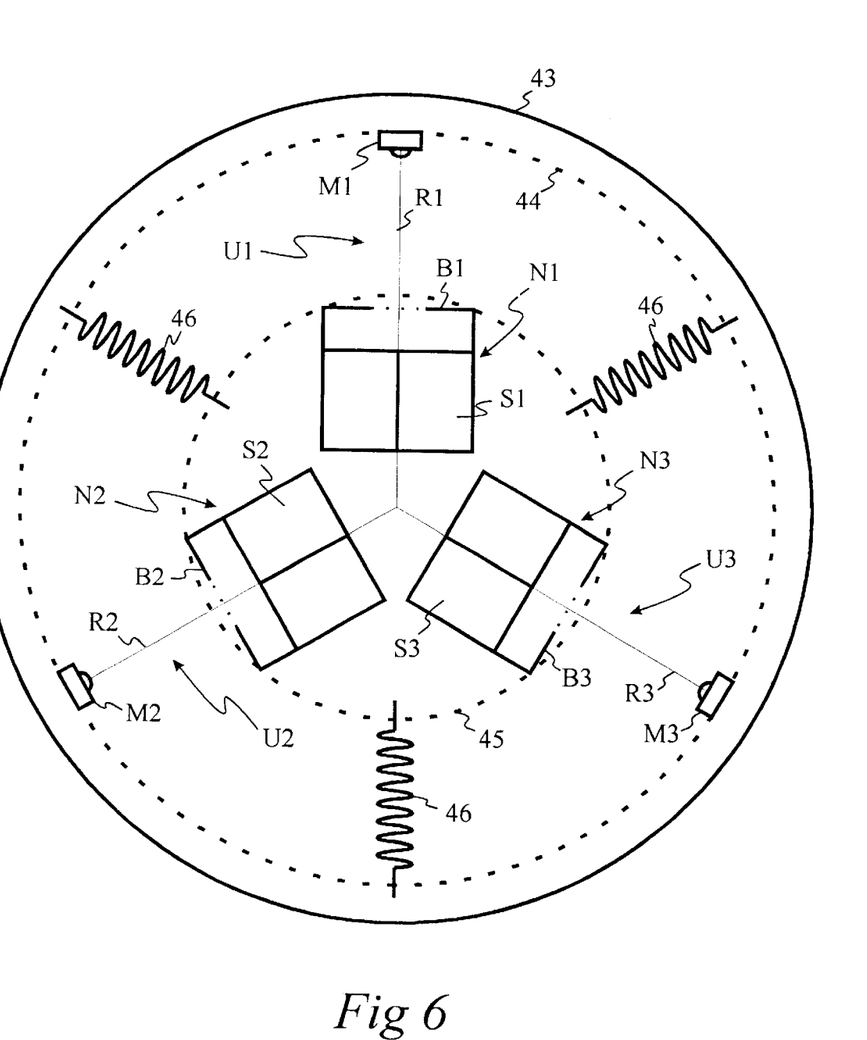
FIG. 6 shows schematically and from above the main components of the pointer in FIG. 5.

FIGS. 5 and 6 illustrate a currently preferred embodiment of a six-dimensional pointer 40 according to the invention. The pointer 40 comprises a stationary base plate 41 with a handrest 42. A cylindrical operating means 43 (below referred to as "puck") is movably mounted on the base plate 41 and is adapted to be operated by the user's hand. The palm of the hand then rests on the handrest 42, which leaves the fingers free to operate the puck 43 in all directions.

The pointer 40 is six-dimensional in the sense that the puck 43 is movable on the one hand in three linear directions X, Y, Z and, on the other hand, in three rotating directions Xrot, Yrot and Zrot. It is to be observed that the puck 43 is freely movable in the xy plane and not only in the x direction and y direction. With a view to, for instance, moving an object on a display "into the display", the user moves the puck 43 forwards, and with a view to rotating the object around itself, the puck 43 is rotated in the corresponding direction.

The puck 43 has the form of a cylindrical shell with an inside 44 indicated in FIG. 6. The dashed inner circle 45 in FIG. 10 represents a stationary holder which is fixedly mounted on and projects from the base 41 to support the puck 43. Between the holder 45 and the puck 43, three circumferentially distributed spring elements 46, such as rubber elements, are arranged in this embodiment, which make it possible for the user to move the puck 43 relative to the holder 45 in the above-mentioned six directions and which ensure that the puck 43 is returned to its starting position if released by the user.

For determining the current position of the puck 43 relative to the holder 45, the pointer 40 comprises three position-sensing units U1, U2, U3, spaced apart by 120°, of the type described above with reference to FIG. 1. Each position-sensing unit U1–U3 comprises a radiation source S1–S3, a receiver M1–M3 and an intermediate screen B1–B3. In each unit U1–U3, the receiver is mounted on the inside 44 of the movable puck 43, while the radiation source and the screen are mounted as an integrated unit or box generally designated N1–N3 on the stationary holder 45. In the non-actuated resting position of the puck 43 according to FIG. 7A, each receiver M1–M3 is radially aligned with its corresponding box N1–N3 along a radius R1–R3.

Each box N1–N3 has four radiating fields according to FIG. 1, which are extended perpendicular to the plane formed of the radii R1–R3. The fields A can preferably be formed of light-spreading plates and posteriorly situated radiation sources an above to form "virtual" radiating surfaces.

Figure 4:
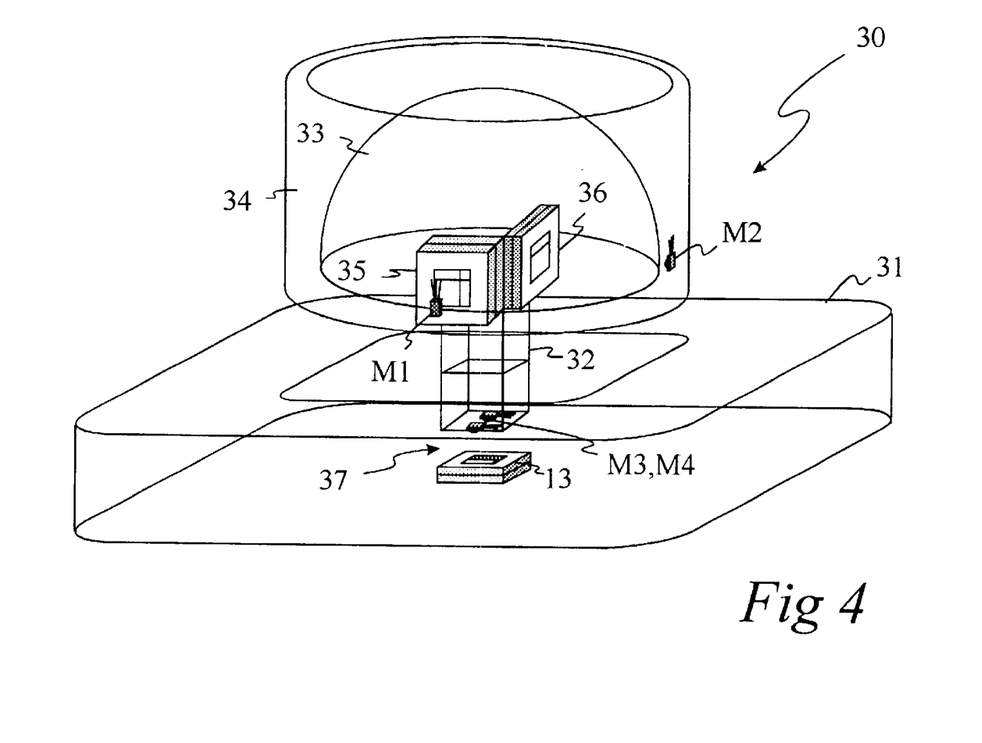
FIG. 4 is a sectional view of the pointer in FIG. 3.

In contrast to the embodiment in FIGS. 3 and 4, where the linear movement and the rotating movement are detected by different position-sensing units, the pointer in FIGS. 5 and 6 uses the units U1–U3 for determining the position in both the linear direction and the rotating direction. This is carried out by determining the direction of three lines, as will now be described with reference to FIGS. 7A and 7B.

Figures 7A, 7B:
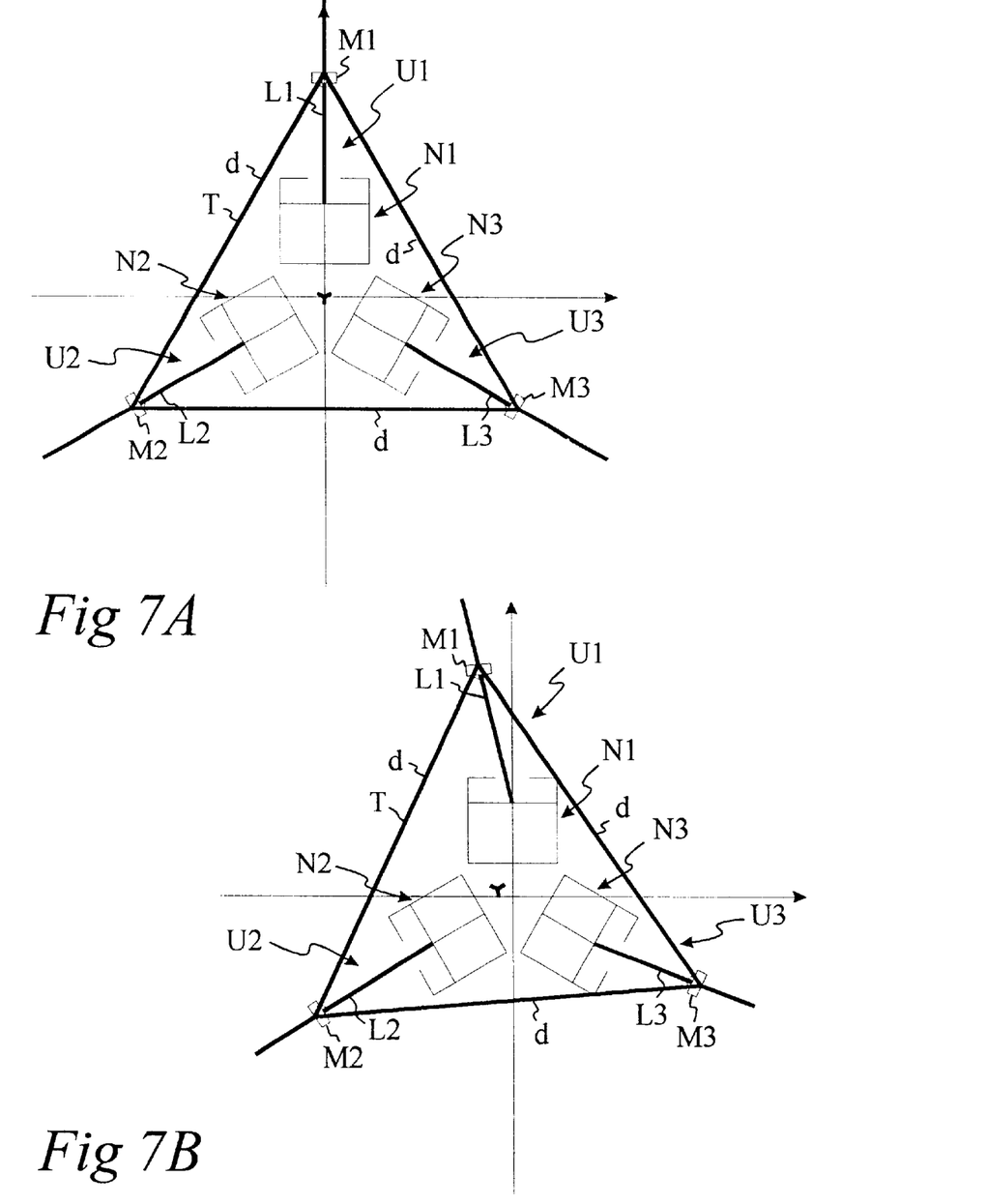
FIGS. 7A and 7B illustrate the made of operation of the pointer in FIG. 5.

No matter how the puck 43 is rotated, the receivers M1–M3 will be positioned in the corners of an equilateral triangle T having a side length "d". In order to calculate the linear position and the rotation of the puck 43 relative to the boxes N1–N3, use is made of the fact that each position-sensing unit U1–U3 allows determination of the direction or equation of the line L1–L3 which connects the receiver M1–M3 with the box N1–N3. The absolute positions of the lines L1–L3 in space can be calculated directly by means of the units U1–U3. The corners of the equilateral triangle T having a side length d should be fitted to these three lines L1–L3, which can be effected in one way only. This gives the corner points of the triangle T in space and, thus, the position of the puck 43 relative to the holder 45. The actual calculation of the triangle position can be carried out, for instance, by iterative calculations. The translation of the puck 43 is calculated by averaging on the three angle points. The rotation of the puck 43 is calculated with the aid of the normal to the plane of the triangle T and the rotation thereof.

The pointer 40 in FIGS. 5 and 6 has three "complete" position-sensing units U1, U2, U3 in the sense that each of them has its own receiver, its own screen and its own radiation source with four fields. However, it is conceivable, in this as well as in other embodiments, to share components between the position-sensing units. In the embodiment in FIG. 5, this can be effected, for instance, by the units U1–U3 sharing IR light-emitting diodes with each other. A common central radiation source with four fields could emit radiation via mirrors to three separate screens B1–B3 and further on to three separate receivers M1–M3. This would make it possible to carry out a complete six-dimensional determination of a position with only three detectors and four IR light-emitting diodes of a conventional and inexpensive design, which would result in an extremely inexpensive pointer.

The above-described pointers according to the invention are adapted to be connected to or, which may be preferred, to comprise themselves calculating means for generating suitable output signals to a computer or other equipment, based on the detector signals from the position-sensing units. Such a calculating means may comprise A/D converters and a suitable processor or the like.

The invention is not restricted to the embodiments described and may be modified within the scope of the appended claims.

In an alternative embodiment, the screen need not be made of a material which completely blocks radiation. It may be sufficient that the screen blocks a substantial part of the radiation or converts the radiation when passing therethrough such that the converted radiation differs from the non-screened radiation.

Pointers according to the invention are multidimensional, i.e. allow controlling in several dimensions, and employ to this end one or more position-sensing units according to the invention for determination of mutually movable parts of the pointer. Within the scope of the invention, all position-sensing units in a pointer may be one-dimensional, even if today it would be preferred to employ units allowing determination in two or more dimensions.

Other radiation (visible or invisible) than IR radiation may be used in the invention.

In the embodiments shown, the screen is arranged at a distance from the fields. In such embodiments, angular changes of the beam path arise in relative movements. In a possible variant, the screen could be arranged in the same plane as the fields and be movable relative to these.

What is claimed is:

1. A position-sensing unit for determining a relative position in at least one dimension, said position-sensing unit comprising:
    a radiation source having at least two fields, each having a radiating surface, wherein each of the at least two fields includes a radiation-spreading medium, which constitutes the radiating surface and which coacts with a separate radiation unit associated with the field,
    a detector for detecting radiation from the respective fields, radiation from one field being distinguishable from radiation from other fields,
    a screen element which is arranged in the beam path between the radiation source and the detector and which, for each determination of a position and seen from the perspective of the detector, partially screens off at least one of the fields but does not completely screen off any one of the fields,
    at least one of the radiation source and the detector being so movable relative to the screen element in a first direction transversely of the direction of radiation that such a relative movement causes a relative change of the screening-off of the fields, and
    means for determining a relative position in said first direction between the screen and at least the one of the radiation source and the detector, based on a comparison between radiation detected by the detector and received from the respective radiating fields.

2. A position-sensing unit for determining a relative position in at least one dimension, said position-sensing unit comprising:
    a detector with at least two fields each having a radiation-detecting surface, wherein each of the at least two fields includes a radiation-spreading medium, which constitutes the radiation-detecting surface and which coacts with a separate detection unit associated with the field,
    a radiation source for emitting radiation to the respective fields, radiation detected by one field being distinguishable from radiation detected by other fields,
    a screen element which is arranged in the beam path between the detector and the radiation source and which, for each determination of a position and seen from the perspective of the radiation source, partially screens off at least one of the fields but does not completely screen off any one of the fields,
    at least one of the detector and the radiation source being so movable relative to the screen element in a first direction transversely of the direction of the radiation that such a relative movement causes a relative change of the screening-off of the fields, and
    means for determining a relative position in said first direction between the screen element and at least the one of the radiation source and the detector, based on a comparison between radiation which is detected by the detector and which falls on the respective radiation-detecting fields.

3. A position-sending unit as claimed in claim 1 or claim 2 for two-dimensional determination of a position, wherein said at least two fields comprise two fields juxtaposed in a first direction for determining the position in a first dimension and two fields juxtaposed in a second direction, perpendicular to the first direction, for determining the position in a second dimension.

4. A position-sensing unit for two-dimensional determining of a position as claimed in claim 3, wherein said at least two fields comprise totally four detector fields each forming a quadrant.

5. A position-sensing unit as claimed in claim 1, wherein said fields are activated sequentially for distinguishing between radiation associated with the respective fields.

6. A position-sensing unit as claimed in claim 1 or claim 2, wherein the screen element partially screens off all fields in each determination of a position.

7. A position-sensing unit as claimed in claim 1 or claim 2, wherein the screen element comprises a radiation-blocking area and a non-radiation-blocking area, one of said areas enclosing the other of said areas or vice versa.

8. A position-sensing unit as claimed in claim 1, wherein the radiation source is an active radiation source which in itself generates radiation.

9. A position-sensing unit as claimed in claim 1, wherein the radiation source is an indirect radiation source which in itself does not generate any radiation, but instead receives this radiation from another place.

10. A pointer for controlling a position in at least two dimensions by operating an operating means of the pointer, wherein the pointer comprises one or more position-sensing units as claimed in claim 1 or claim 2, for determining the relative position in at least two dimensions between the operating means and a support.

11. A pointer as claimed in claim 10 for controlling a position in six dimensions, the operating means having corresponding six degrees of freedom.

12. A pointer as claimed in claim 11, wherein the operating means (43) is movably suspended from and encloses a central holder (45) of the pointer for linear movement in three linear directions and rotating movement in three rotating directions.

13. A pointer as claimed in claim 12, comprising three two-dimensional position-sensing units, which are distributed circumferentially around the central holder and which each have four fields.

14. A pointer as claimed in claim 10, comprising two or more position-sensing units as claimed in any one of claims 1–11, wherein at least one radiation source and/or a detector and/or a screen element are shared between two or more position-sensing units.

* * * * *

UNITED STATES PATENT AND TRADEMARK OFFICE
CERTIFICATE OF CORRECTION

PATENT NO.    : 6,333,733 B1
DATED         : December 25, 2001
INVENTOR(S)   : Björn Anderson et al.

It is certified that error appears in the above-identified patent and that said Letters Patent is hereby corrected as shown below:

<u>Column 10,</u>
Line 63, "1-11" should read -- 1-9 --.

Signed and Sealed this

Twenty-third Day of September, 2003

JAMES E. ROGAN
*Director of the United States Patent and Trademark Office*